United States Patent [19]

Heath

[11] 4,358,243

[45] Nov. 9, 1982

[54] MULTIPLE ROTARY WIND POWER SYSTEMS

[76] Inventor: Oran M. Heath, 5603 Ravella Dr., Farmington, N. Mex. 87401

[21] Appl. No.: 145,458

[22] Filed: Apr. 30, 1980

[51] Int. Cl.³ .................... F03D 1/02; F03D 11/02
[52] U.S. Cl. .................. 416/11; 416/170 R; 416/121; 74/381; 74/417
[58] Field of Search .......... 416/170 R, 9, 11, DIG. 3, 416/176 A, 121 A; 74/381, 417

[56] References Cited

U.S. PATENT DOCUMENTS

| | | | |
|---|---|---|---|
| 601,972 | 4/1898 | Leonhart | 416/11 |
| 2,517,135 | 8/1950 | Rudisill | 416/9 |
| 4,084,102 | 4/1978 | Fry et al. | 416/85 |
| 4,217,501 | 8/1980 | Allison | 416/176 |

FOREIGN PATENT DOCUMENTS

| | | | |
|---|---|---|---|
| 841254 | 5/1939 | France | 416/176 A |
| 213022 | 3/1924 | United Kingdom | 416/11 |

Primary Examiner—Robert E. Garrett

[57] ABSTRACT

A wind power system driven by multiple rotary devices strung on a cable.

3 Claims, 5 Drawing Figures

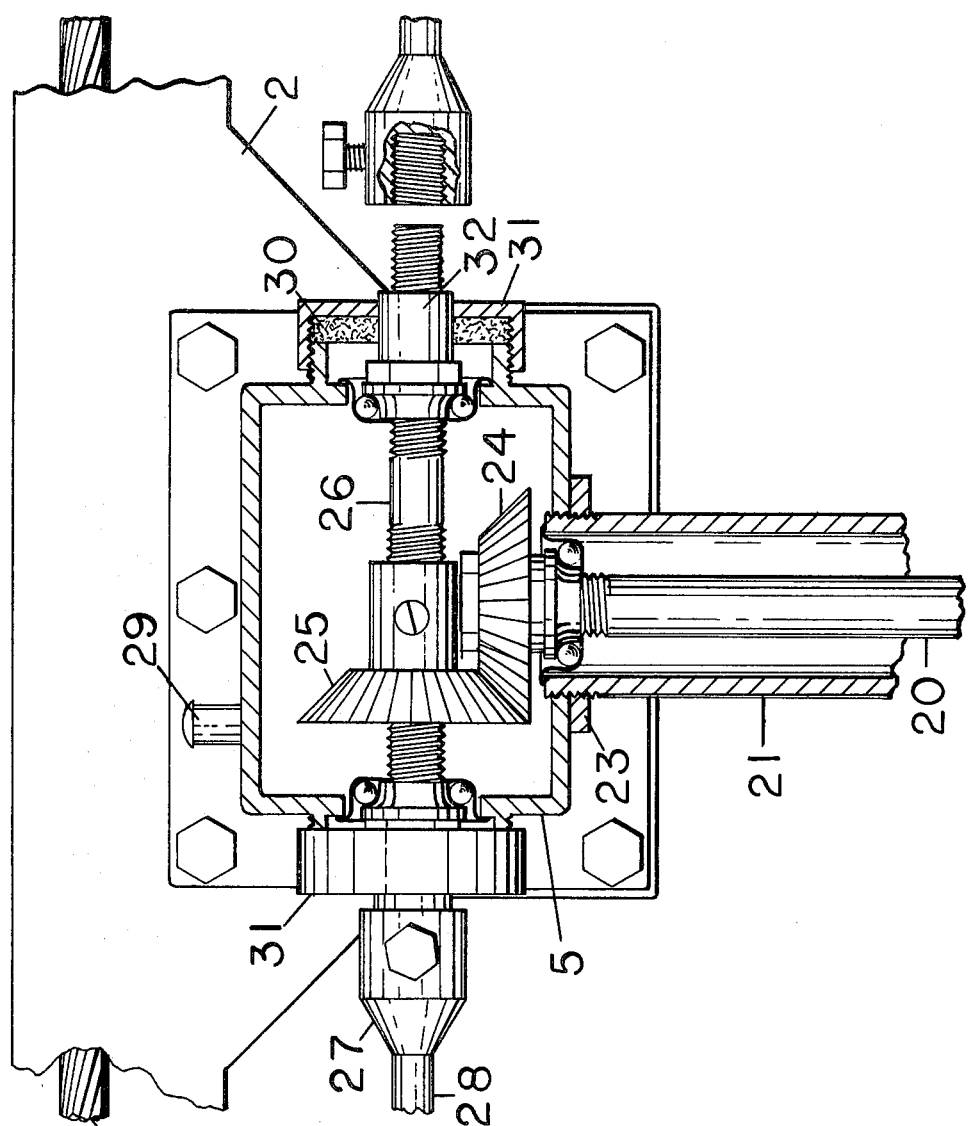
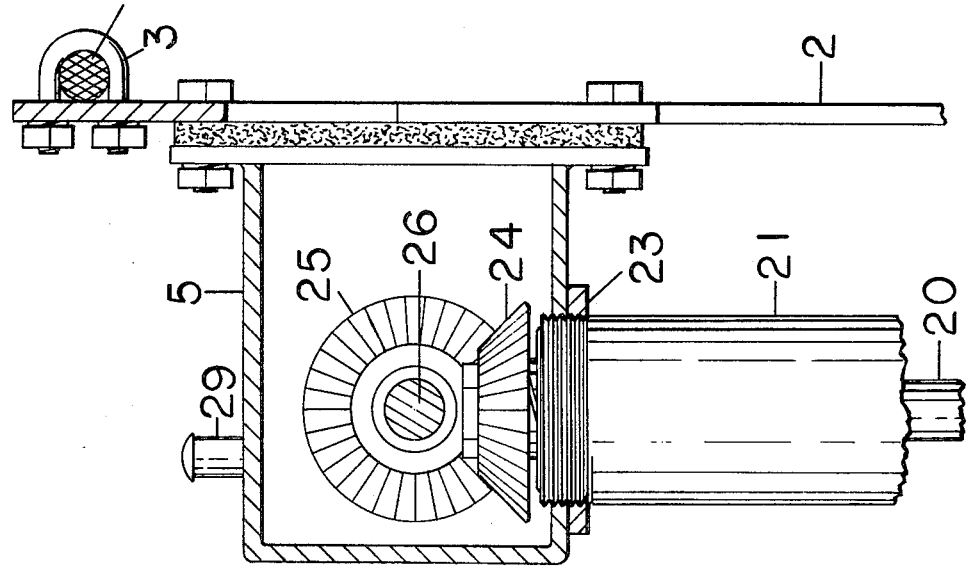
FIG. 5
FIG. 4

MULTIPLE ROTARY WIND POWER SYSTEMS

Reference is made to my copending patent application Ser. No. 145,457 filed Apr. 30, 1980 for a Suspended Wind-Powered Rotary Impeller Device.

My invention relates to support and energy extraction means for a system of multiple like rotary devices which are strung on a cable.

A primary object of my invention is to present a wind-power system comprising several like rotary devices suspended at intervals on a cable, together with device support means and power transmission means.

Another object is to present a support system as indicated above which will accept winds from any direction.

Another object is to present a means for transmitting rotational torque energy from said multiple rotary devices to a common external power receiving unit.

Other objects will detailed in the following descriptions and specifications, and in conjunction with the accompanying drawings, in which all identical parts are like numbered.

In accomplishing these and other objects, my invention is not limited to the form or forms disclosed.

FIG. 4 is an enlarged view of the upper level means shown in FIG. 2.

FIG. 5 is an open face side view of the device shown in FIG. 4.

Figure 1:
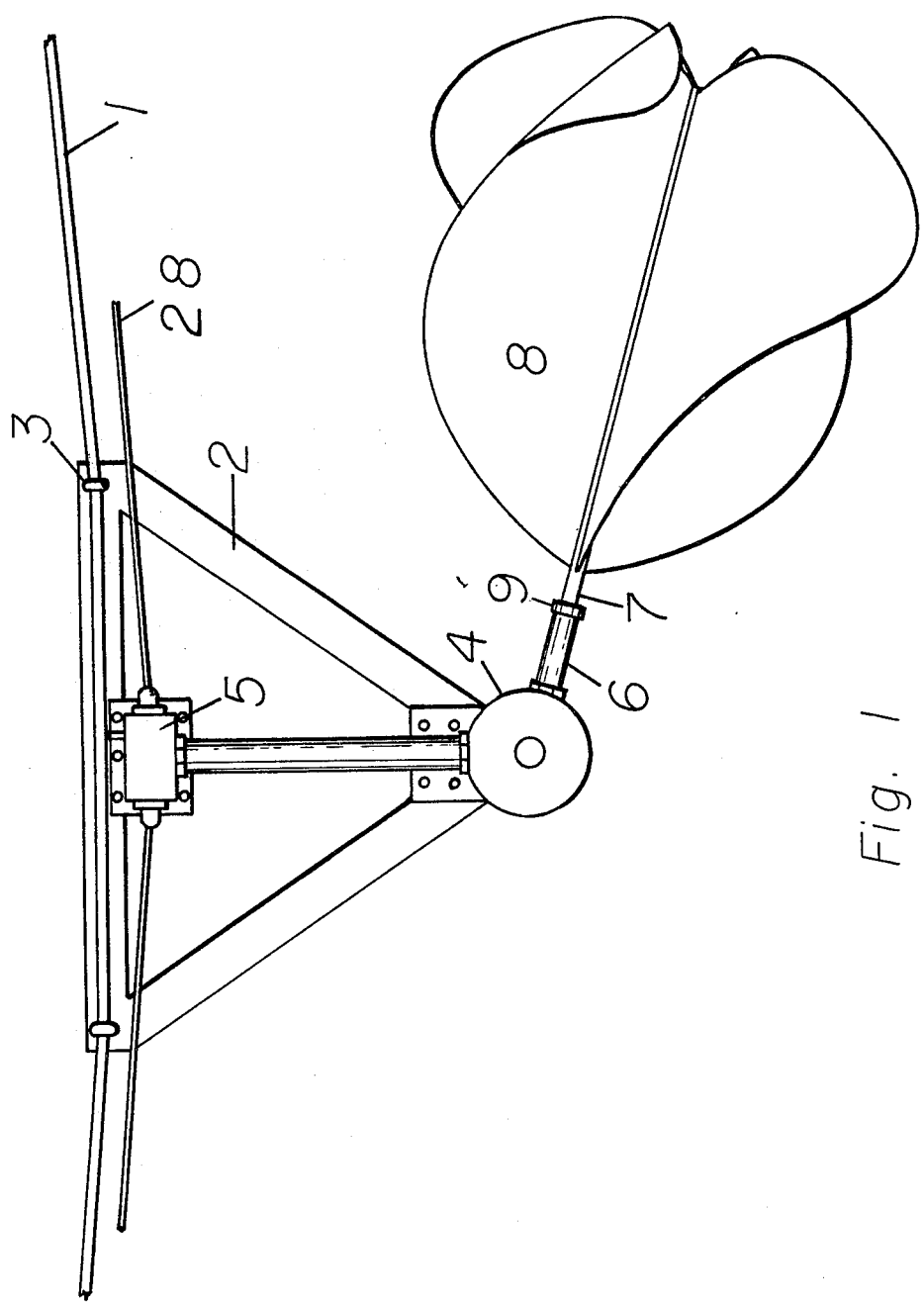
FIG. 1 is a side view of a device illustrating the principles of my invention.
Figure 2:
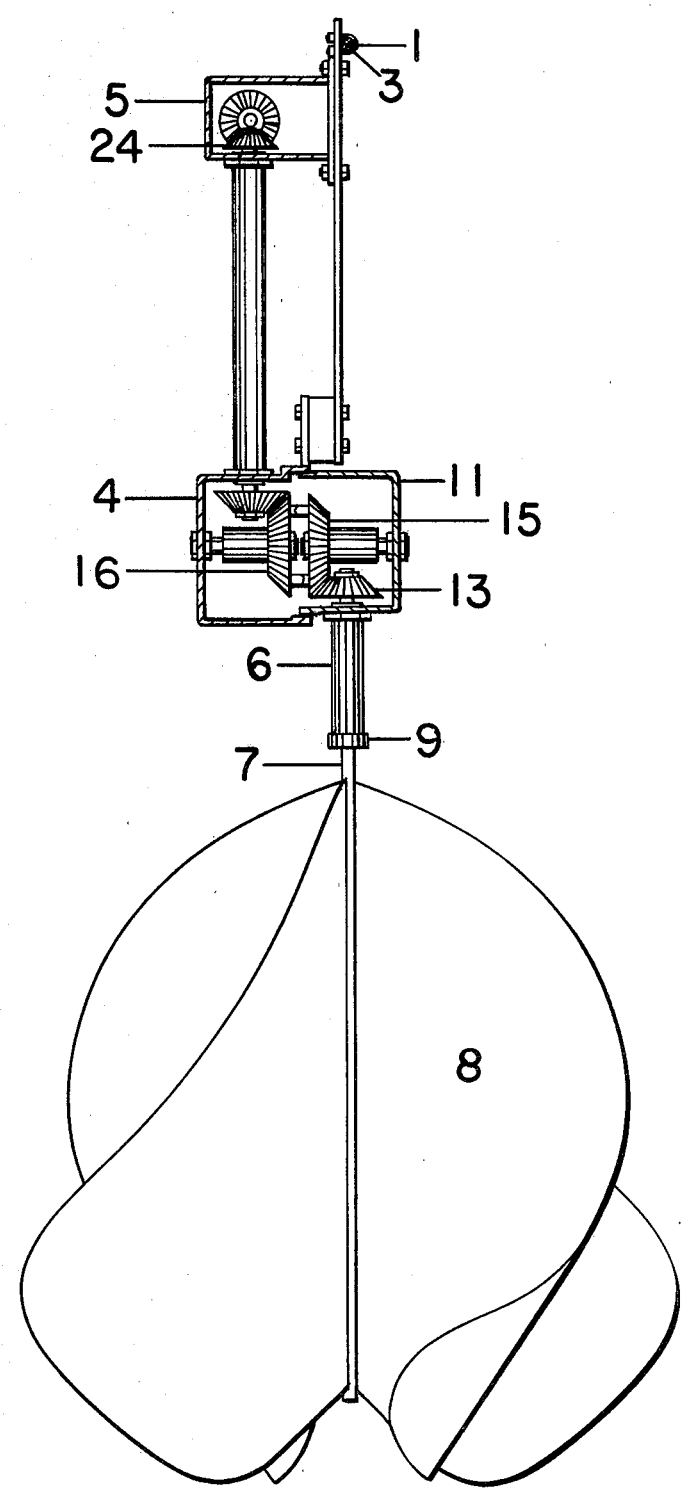
FIG. 2 is an open face edge view of the device shown in FIG. 1.
Figure 3:
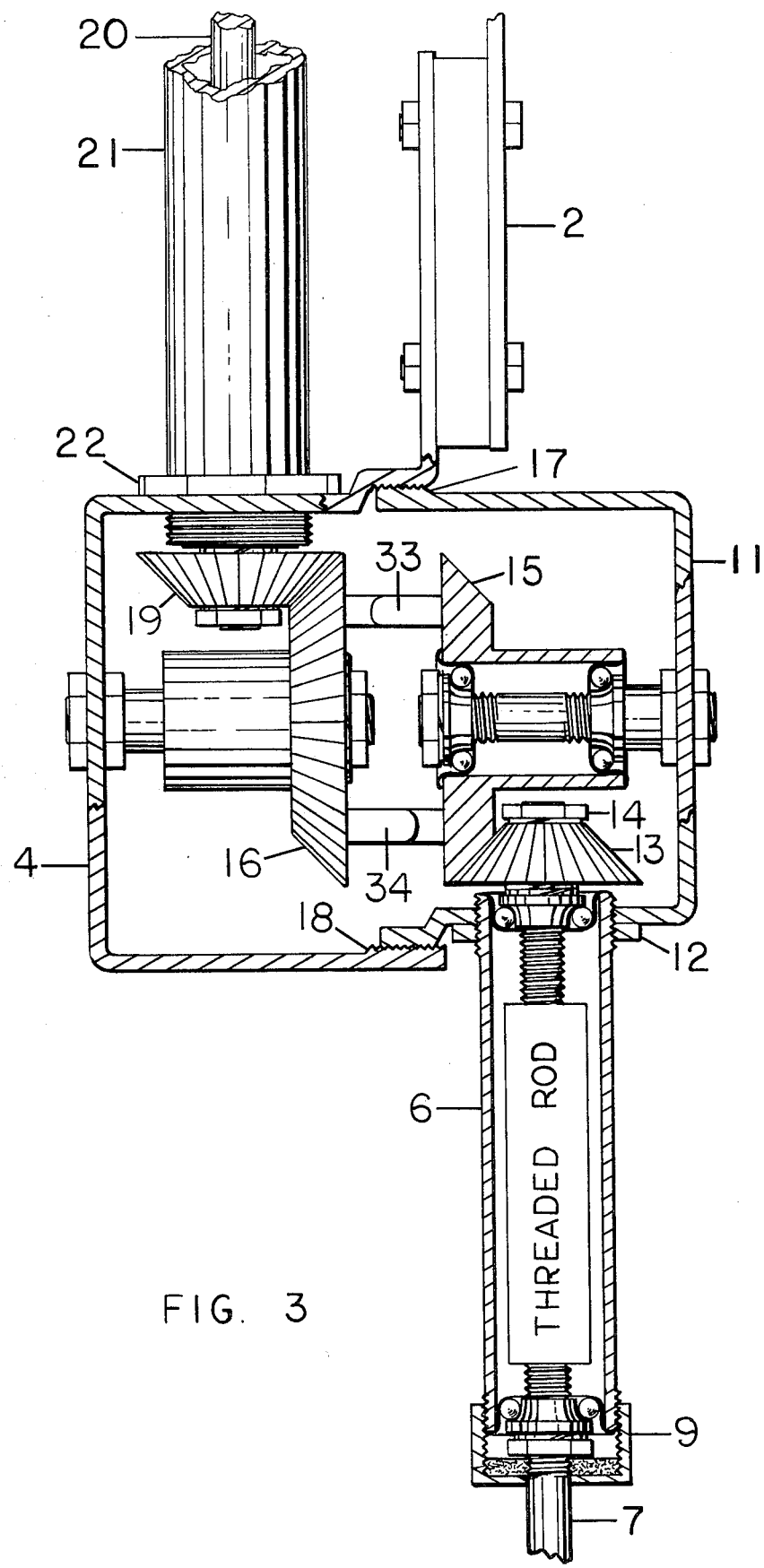
FIG. 3 is an enlarged view of the lower level means shown in FIG. 2.

The conventional wind power system comprises a single wheel or propellor on a single rigid support tower, driving a single power receiving unit.

My invention substitutes multiple devices for the single wheel or propellor in the conventional system, substitutes a single cable supported by external means for the conventional tower, and adds power transmission means linking said multiple devices to a single power receiving unit.

A segmented flexible shaft having one segment between each said rotary device suspension means, capable of withstanding turning torque in either direction, transfers energy from my devices to an external power receiving unit.

In its preferred form, my system has all gears and bearings immersed in oil to reduce friction and minimize servicing requirements.

My system permits the suspended rotary devices to assume, within all practical limits, whatever direction or angle of declination is dictated by wind forces. The devices swing essentially in unison to either side of a cable fastened to external rotatable means. However, each device is independently moveable within limits in either direction in line with said cable. This combination of allowable movements permits universal direction and declination positioning within practical limits for each device. Said suspension rods tend to assume parallel positions, ranging from vertical to horizontal, depending on wind speed.

In the drawings:

Both ends of Cable 1 are fastened to external rotatable support means, not shown. Suspension Frame 2 is secured to Cable 1 by Clamps 3. Lower Housing 4 and Upper Housing 5 are affixed to Suspension Frame 2 by conventional bolts, with gaskets and spacers as required. Pipe 6 encases the upper threaded end of Suspension Rod 7, the lower end of which is fixed to Rotary Device 8. Pipe 6 is threaded at both ends, and capped on the lower end by Cap 9 which encloses Grease Seal 10. The upper end of Pipe 6 screws into rotatable Housing 11 and is sesured by Nut 12. Pipe 6, with its enclosed bearing assembly, fully supports Suspension Rod 7 and its affixed Rotary Device 8, which are more fully described in my copending patent application referred to above. The preferred bearing assembly in Pipe 6 is equivalent to that in the front spindle of a bicycle.

Gear 13, secured by Nut 14, is affixed to the upper end of Suspension Rod 7. Gear 15 and Gear 16 are slideably interlocking, moving closer together, or farther apart, with any rotation of Housing 11 with respect to Housing 4. Gears 15 and 16 are mounted upon conventional bearing supports. The axle of Gear 15 is affixed to Housing 11, while the axle of Gear 16 is affixed to Housing 4. Housing 11 is fitted with male Threads 17, while Housing 4 is fitted with female Threads 18, to permit Housing 11 to be screwed into Housing 4. The meshing Threads 17 and 18 act as a lubricated bearing to permit Housing 11 to rotate with respect to Housing 4. Gear 15 is fitted with Protruding Teeth 33, and Gear 16 is fitted with Protruding Teeth 34 which interlock when Housing 11 is screwed into Housing 4.

Gear 16 meshes with and drives Gear 19, which is fixed to Rod 20. Rod 20 is supported within Pipe 21 by bearings like those in Pipe 6. Pipe 21 is threaded at both ends and the lower end is screwed into Housing 4 and secured by Nut 22, while the upper end is screwed into Housing 5 and secured by Nut 23. Gear 24 is fixed to the upper end of Rod 20 amd meshes with and drives Gear 25, which is fixed to Drive Shaft 26. Drive Shaft 26 is secured within Housing 5 on conventional bearings, and is threaded at both ends for engagement into threaded Receptacles 27 which are fixed to the ends of Flexible Shafts 28. Conventional capped oil Injection Pipe 29 is affixed to the top of Housing 5. Grease Seals 30 are retained by Caps 31. Threaded Sleeves 32 serve to restrain leakage of lubricating oil.

I claim:

1. A wind-powered energy converter system comprising a cable stretched horizontally between external supports, multiple like rigid frames attached at intervals to said cable and pendent therefrom, said frames being fitted with torque power transmission means together with holding means for holding an appended external rotary wind driven impeller, wherein one said impeller is held in suspension beneath each said frame by having the upper extremity of a support member of said impeller securely held in rotatable contact with said torque power transmission means, and wherein said holding means permits said support member of said impeller to be deployed at any angle of declination from vertical to horizontal in either direction within the plane of said cable.

2. A device as claimed in claim 1, wherein said holding means for said external impeller comprises a threaded housing fixed to said frame and a rotatable threaded housing threadedly joined therewith, wherein said external support means is fixed rotatably into said rotatable threaded housing.

3. A device as claimed in claim 2, wherein the two said threaded housings enclose a cavity which contains two sets of matching gears on conventional shafts and bearings, comprising, for each said housing, a first gear set upon a shaft which is fixed to said housing wall, centered with respect to threaded open extremity of said housing and normal to the plane of such threaded extremity, and a second gear meshing therewith at right angles, which second gear is fixed to a drive shaft extending outward from said housing, and wherein said first gear of said fixed housing is fitted with protruding teeth which slideably interlock with like teeth in the opposing said first gear of said rotatable housing when the two said housings are threadably joined.

* * * * *